United States Patent
Matsuoka

(10) Patent No.: US 8,577,423 B2
(45) Date of Patent: Nov. 5, 2013

(54) VIBRATION TONE DIFFERENTIATION

(75) Inventor: Yomi Matsuoka, Cupertino, CA (US)

(73) Assignee: Palm, Inc., Sunnyvale, CA (US)

( * ) Notice: Subject to any disclaimer, the term of this patent is extended or adjusted under 35 U.S.C. 154(b) by 1025 days.

(21) Appl. No.: 12/038,212

(22) Filed: Feb. 27, 2008

(65) Prior Publication Data
US 2009/0215432 A1    Aug. 27, 2009

(51) Int. Cl.
*H04M 1/00*    (2006.01)
*H04M 3/00*    (2006.01)
*H04M 5/00*    (2006.01)
*H04B 1/38*    (2006.01)

(52) U.S. Cl.
USPC ......... 455/567; 455/550.1; 379/164; 379/252

(58) Field of Classification Search
USPC ............. 455/466, 67.7, 567, 414.1, 415, 458, 455/550.1; 379/164, 179, 252, 373.01, 379/373.02, 373.03, 374.03
See application file for complete search history.

(56) References Cited

U.S. PATENT DOCUMENTS

| 7,312,712 | B1 * | 12/2007 | Worrall et al. | 340/573.4 |
| 7,801,569 | B1 * | 9/2010 | Zellner | 455/567 |
| 7,852,865 | B2 * | 12/2010 | Gay | 370/412 |
| 2004/0066932 | A1 * | 4/2004 | Seligmann | 379/373.01 |
| 2004/0213401 | A1 | 10/2004 | Aupperle et al. | |
| 2005/0025296 | A1 * | 2/2005 | Benco et al. | 379/88.22 |
| 2005/0058268 | A1 | 3/2005 | Koch | |
| 2005/0168333 | A1 | 8/2005 | Cronin | |
| 2005/0282531 | A1 * | 12/2005 | Andreasson | 455/418 |
| 2006/0003812 | A1 * | 1/2006 | Moody et al. | 455/567 |
| 2006/0248183 | A1 | 11/2006 | Barton | |
| 2008/0165731 | A1 * | 7/2008 | Zellner | 370/329 |
| 2009/0117922 | A1 * | 5/2009 | Bell et al. | 455/466 |
| 2009/0215474 | A1 * | 8/2009 | Hellebust et al. | 455/458 |
| 2010/0081464 | A1 * | 4/2010 | Qu et al. | 455/466 |

FOREIGN PATENT DOCUMENTS

| DE | 10161133 A1 | 7/2003 |
| EP | 05254086.1 | 1/2006 |

OTHER PUBLICATIONS

Supplementary EP Search Report: EP 09714158.4-2414 /2248360 ; Dec. 7, 2011.

* cited by examiner

*Primary Examiner* — Andrew Wendell

(57) ABSTRACT

A system, apparatus, method and article to perform vibration tone differentiation are described. The apparatus may include a mobile computing device. The mobile computing device may comprise a messaging client. The messaging client may receive an incoming message sent to the mobile computing device. The messaging client may parse communication information from the incoming message. The messaging client may determine a priority level of the incoming message from the communication information. The mobile computing device may also comprise a motor controller. The motor controller may retrieve a vibration sequence associated with the priority level and instruct a vibrate motor to vibrate according to the vibration sequence. Other embodiments are described and claimed.

20 Claims, 4 Drawing Sheets

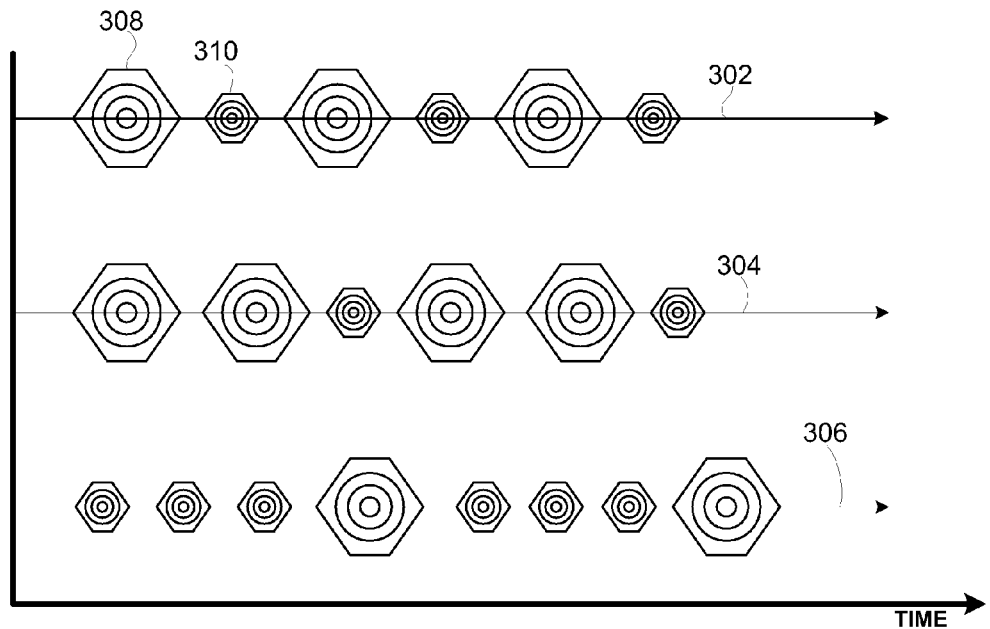

VIBRATION TONE DIFFERENTIATION

BACKGROUND

Mobile computing devices, such as smart phones, may provide wireless communication capabilities. A mobile computing device may have the ability to notify a user of an incoming communication. The user of a mobile computing device may be notified through audible alerts, vibration tone alerts, or visual alerts. A mobile computing device that has received incoming communication information may notify a user of the mobile computing device using a vibration tone alert that is based upon the incoming communication information. Accordingly, there may be a need for an improved apparatus and methods for providing vibration tone differentiation.

BRIEF DESCRIPTION OF THE DRAWINGS

FIG. 2 illustrates one embodiment of an incoming message.

FIG. 3 illustrates one embodiment of a vibration sequence.

DETAILED DESCRIPTION

Figure 1:
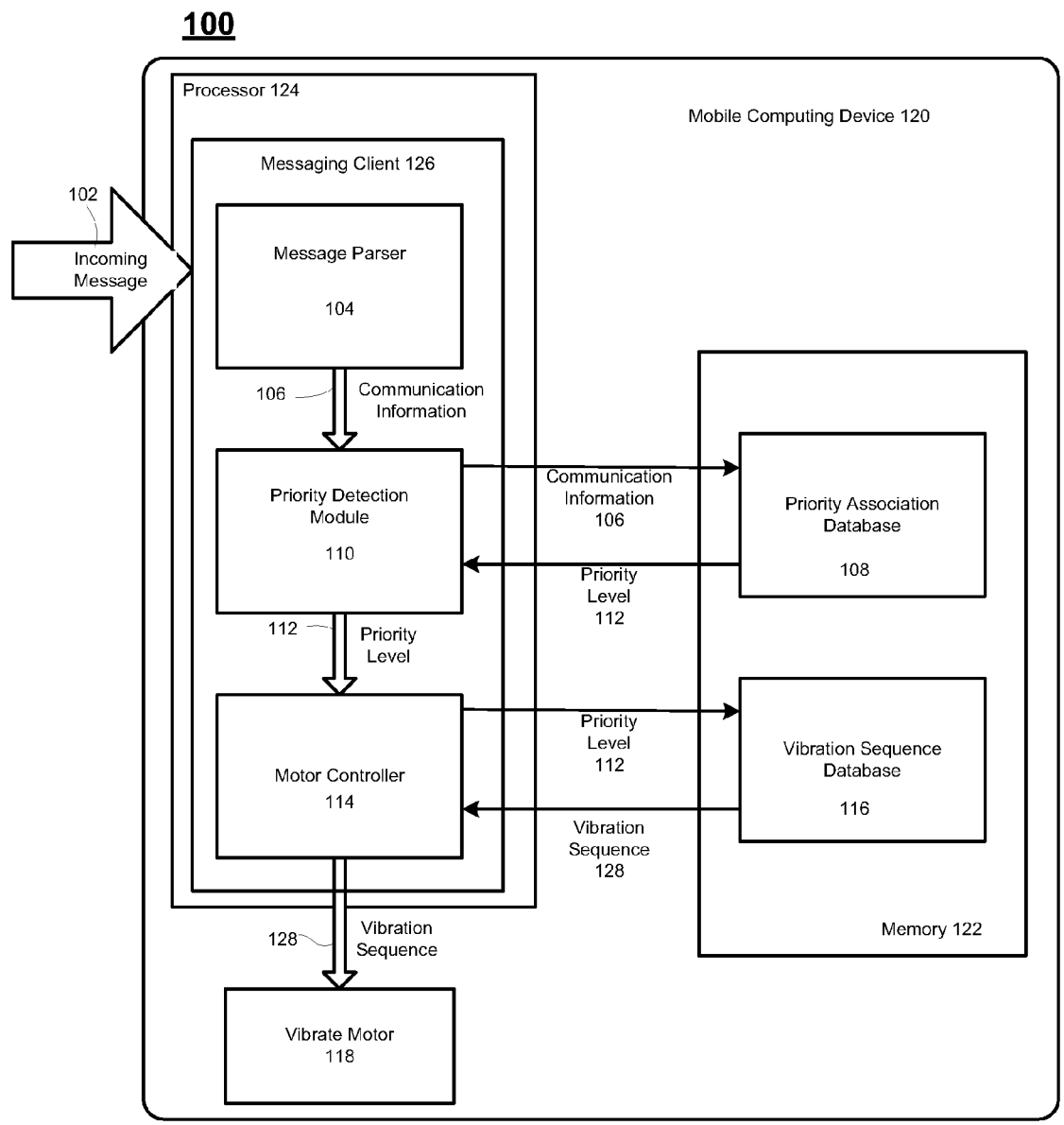
FIG. 1 illustrates one embodiment of a mobile computing device.

Various embodiments may be generally directed to vibration tone differentiation. In one embodiment, for example, a mobile computing device, such as a smart phone, may receive incoming communication information. Some embodiments may be particularly directed to vibration tone differentiation by a mobile computing device. For example, a mobile computing device may provide vibration tone differentiation based upon incoming communication information. In this manner, a user of a mobile computing device may be notified of incoming communication information using tactile output, thereby avoiding or augmenting other modalities such as visual or audible outputs. Other embodiments may be described and claimed.

In one embodiment, for example, a mobile computing device may include a messaging client to receive incoming messages sent to the mobile computing device. The messaging client may parse communication information from the incoming message. The messaging client may determine a priority level of the incoming message from the communication information. The messaging client may also include a motor controller. The motor controller may retrieve a vibration sequence that is associated with the priority level. The motor controller may instruct a vibrate motor to vibrate according to the vibration sequence. Other embodiments may be described and claimed.

A mobile computing device that may perform vibration tone differentiation may provide several advantages. For example, a typical mobile computing device may notify a user of incoming communication information using a standard vibration tone. Incoming communication information may include phone call information, message type, email information, sender identification, message urgency, voicemail information or receiver identification. The user of a typical mobile computing device may prioritize different types of incoming communication information. For example, the user of a typical mobile computing device may want to answer all phone calls from a particular person and ignore all email messages that are not marked as urgent. A typical mobile computing device, however, may use the same vibration tone regardless of the incoming communication information. The user of a typical mobile computing device may be required to check the mobile computing device for all incoming communication information because the vibration tone is not indicative of the incoming communication information. The user of a typical mobile computing device may inadvertently ignore an important communication or miss an important phone call because the mobile computing device uses a standard vibration tone regardless of the priority of the incoming communication. Accordingly, there may be a need for an improved apparatus and methods for providing vibration tone differentiation.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates one embodiment of a mobile computing device. FIG. 1 illustrates a block diagram of wireless communication system 100. As shown in FIG. 1, wireless communication system 100 comprises multiple elements, such as mobile computing device 120. The mobile computing device 120 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 120 implemented as a smart phone by way of example, it may be appreciated that the embodiments are not limited in this context. For example, the mobile computing device 120 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. The embodiments, however, are not limited to the elements shown in this figure. Additional details for a mobile computing device may be described in more detail with reference to FIG. 5.

The processor 124 may comprise a general purpose processor or an application specific processor arranged to provide general or specific computing capabilities for the wireless communications system 100. For example, the processor 124 may perform operations associated with higher layer protocols and applications. For instance, the processor 124 may be implemented as a host processor to provide various user applications, such as telephony, text messaging, e-mail, web browsing, word processing, video signal display, and so forth. In addition, the processor 124 may provide one or more functional utilities that are available to various protocols, operations, and/or applications. Examples of such utilities include operating systems, device drivers, user interface functionality, and so forth.

The memory 122 may comprise computer-readable media such as volatile or non-volatile memory units arranged to store programs and data for execution by the processor 124. As depicted in FIG. 1, the memory 122 may store a priority association database 108 in the form of executable program instructions, code or data. The processor 124 may retrieve and execute the program instructions, code or data from the memory 122 to control or provide vibration tone differentiation for the mobile computing device 120. Although the priority association database 108 is shown as part of the memory 122 for execution by the processor 124, it may be appreciated that the priority association database 108 may be stored and executed by other memory and processing resources available to the mobile computing device 120. Further, although the priority association database 108 is depicted as software executed by a processor, it may be appreciated that the operations for the priority association database 108 may be implemented in hardware as well using one or more integrated circuits, for example.

As depicted in FIG. 1, the memory 122 may also store a vibration sequence database 116 in the form of executable program instructions, code or data. The processor 124 may retrieve and execute the program instructions, code or data from the memory 122 to control or provide vibration tone differentiation for the mobile computing device 120. Although the vibration sequence database 116 is shown as part of the memory 122 for execution by the processor 124, it may be appreciated that the vibration sequence database 116 may be stored and executed by other memory and processing resources available to the mobile computing device 120. Further, although the vibration sequence database 116 is depicted as software executed by a processor, it may be appreciated that the operations for the priority association database 108 may be implemented in hardware as well using one or more integrated circuits, for example. The embodiments are not limited in this context.

Mobile computing device 120 may include by way of example and not limitation messaging client 126, message parser 104, priority detection module 110, motor controller 114, vibrate motor 118, priority association database 108 and vibration sequence database 116. These elements or portions of these elements may be implemented in hardware, software, firmware, or in any combination thereof.

In various embodiments, mobile computing device 120 may comprise messaging client 126. The messaging client 126 may be used to receive, send, create, edit, save, configure and organize messages. Messages may include phone calls, short message service (SMS) messages, multimedia messaging service (MMS) messages, instant messages, email messages, pager messages, voicemail, facsimiles, calendar event requests or website notifications. The embodiments, however, are not limited to this example.

In various embodiments, the messaging client 126 may comprise message parser 104. The message parser 104 may support the receiving and interpretation of an incoming message. The message parser 104 may be arranged to parse the communication information from the incoming message, for example. The message parser 104 may pass the relevant communication information to priority detection module 110.

In various embodiments, the messaging client 126 may comprise priority detection module 110. The priority detection module 110 may receive communication information from the message parser 104. The priority detection module may communicate with priority association database 108. The priority detection module 110 may use the communication information to look up and retrieve a priority level in the priority association database 108. The priority detection module 110 may determine the priority level of the incoming message from the communication information.

In various embodiments, memory 122 may comprise priority association database 108. The priority association database 108 may store communication information and priority levels. The priority association database 108 may be arranged to store priority levels for communication information. The priority association database 108 may be used by the priority detection module 110 to retrieve priority levels that are associated with particular communication information.

It can be appreciated that, in some cases, the priority levels may be configurable by the user of a mobile computing device. In one embodiment, for example, a user of mobile computing device 120 may configure priority levels that are stored in the priority association database 108. The configuration of priority levels may be performed within a user interface (UI) supported by the mobile computing device. In other cases, the priority levels may be automatically configured based on a set of heuristics or rules provided for a given implementation.

In various embodiments, the messaging client 126 may comprise motor controller 114. The motor controller 114 may be responsible for controlling vibrate motor 118. The motor controller 114 may instruct the vibrate motor 118 to vibrate in response to an incoming message. The motor controller 114 may receive a priority level from the priority detection module 110. The motor controller 114 may communicate with the vibration sequence database 116. The motor controller 114 may use the priority level to look up and retrieve a vibration sequence in the vibration sequence database 116. The motor controller 114 may instruct the vibrate motor 118 to vibrate according to the retrieved vibration sequence. The motor controller 114 may be responsible for instructing the vibrate motor 118 to vibrate according to additional user preferences. For example, the motor controller 114 may instruct the vibrate motor 118 to vibrate for a period of time, a speed, an intensity, or other user-configurable parameter. The embodiments, however, are not limited to this example.

In various embodiments, mobile computing device 120 may comprise vibration sequence database 116. The vibration sequence database 116 may store vibration sequences that are associated with particular priority levels. The vibration sequence database 116 may be used by the motor controller 114 to retrieve one or more vibration sequences that are associated with a particular priority level.

In various embodiments, mobile computing device 120 may comprise vibrate motor 118. Vibrate motor 118 is capable of producing some form of tactile output, such as vibration, so that a user of the mobile computing device may be notified of an event. The vibrate motor 118 may be enabled or disabled according to the preferences of the user of the mobile computing device 120. When enabled, the vibrate motor 118 may cause the mobile computing device 100 to move or shake in a generic and/or patterned fashion in response to a triggering event such as the receipt of a telephone call, text message, an alarm condition, a game condition, and so forth. Vibration may occur for a fixed duration and/or periodically according to a pulse. For example, the user of a mobile computing device may wish to be notified when a new email message has arrived on the mobile computing device. If a new email message is received on the mobile computing device, the vibrate motor may vibrate to notify the user of the mobile computing device 120. Vibrate motor 118 may respond to instructions from the motor controller 114. For example, the motor controller 114 may instruct the vibrate motor 118 to vibrate in accordance with a vibration sequence. In this manner, a user or operator may then recognize various characteristics of a message (e.g., type, priority, sender, message content, and so forth) based on tactile output, without necessarily viewing or hearing corresponding visual or audible outputs from the mobile computing device 120, and determine whether to retrieve the message accordingly. This may be useful, for example, whenever the mobile computing device 120 is within a pocket or other clothing item within tactile sensing range of the user or operator.

In general operation, mobile computing device 120 may perform vibration tone differentiation. The mobile computing device 120 may receive an incoming message and parse communication information from the incoming message. The mobile computing device 120 may also determine a priority level of the incoming message using the communication information. The mobile computing device 120 may retrieve a vibration sequence associated with the priority level and instruct a vibrate motor to vibrate according to the vibration sequence.

FIG. 2 illustrates one embodiment of an incoming message. FIG. 2 illustrates a block diagram of incoming message 200. As shown in FIG. 2, incoming message 200 comprises multiple elements, such as message type, sender identification, message urgency, receiver identification and message content. Incoming message 200 may comprise any data or information that may be included within a message sent to a mobile computing device. The embodiments, however, are not limited to the elements shown in this figure.

In various embodiments, incoming message 200 may comprise message type 202. The message type 202 may identify the type of message that has been sent to a mobile computing device. Examples for the message type 202 may include, but are not limited to, a phone call, SMS, MMS, instant message, email message, voicemail, facsimile, calendar event request or website notification. The embodiments, however, are not limited to this example.

In various embodiments, incoming message 200 may comprise sender identification 204. The sender identification 204 may comprise information related to the sender of a message. Examples for the sender identification 204 may include, but are not limited to, the sender's name, contact information, company name, phone number, instant messaging screen name, email address, facsimile number, GPS coordinates, network address, Uniform Resource Locator (URL), Internet Protocol (IP) address, media access control (MAC) address, protocol identifier, session initiation protocol (SIP) identifier, and so forth. The embodiments, however, are not limited to this example.

In various embodiments, incoming message 200 may comprise message urgency 206. The message urgency 206 may comprise information related to the urgency of an incoming message. Examples for the message urgency 206 may include, but are not limited to, very high urgency, high urgency, medium urgency, low urgency or no urgency. Any number of urgency levels may be assigned based on a level of granularity needed for a given implementation. The embodiments are not limited to this example.

In various embodiments, incoming message 200 may comprise receiver identification 208. The receiver identification 208 may comprise information related to the intended or unintended recipient of an incoming message. Examples for the receiver identification 208 may include, but are not limited to, any of the examples given for sender identification 204, including the recipients name, company name, phone number, instant messaging screen name, email address, facsimile number, GPS coordinates, Uniform Resource Locator (URL) or Internet Protocol (IP) address. The embodiments, however, are not limited to this example.

In various embodiments, incoming message 200 may comprise message content 210. The message content 210 may comprise information related to the content of the incoming message 210. Examples for the message content 210 may include, but are not limited to, text, multimedia file information, calendar information, facsimile information, website information, SMS information, MMS information, instant messaging information, video conference information, hypertext markup language (HTML) information, extensible markup language (XML) information, GPS coordinate information or any other information that may be contained within the incoming message. The embodiments, however, are not limited to this example.

In general operation, incoming message 200 may be sent to a mobile computing device 120. The user of the mobile computing device 120 may prioritize an incoming message based upon various factors that may include the message type, sender identification, message urgency, receiver identification, the message content, and so forth. The mobile computing device 120 may receive an incoming message and parse communication information from the incoming message. The mobile computing device 120 may also determine a priority level of the incoming message using the communication information. The mobile computing device 120 may retrieve a vibration sequence associated with the priority level and instruct the vibrate motor 118 to vibrate according to the vibration sequence.

FIG. 3 illustrates various examples of vibration sequences depicted in vibration sequence table 300. The vibration sequences illustrated in vibration sequence table 300 may be stored within a vibration sequence database. For example, vibration sequences 302, 304 and 306 may each be associated with one or more priority levels. Vibration sequences 302, 304 and 306 may be comprised of any number and combination of short and long vibrations. For example, vibration sequence 302 may comprise long vibration 308. The long vibration 308 may comprise a vibration that lasts for some defined time period, such as 1 second, for example. Vibration sequence 302 may also comprise short vibration 310. The short vibration 310 may comprise a vibration that lasts for a defined time period that is shorter relative to the defined time period for the long vibration 308, such as 0.5 second, for example. The various vibration sequences 302 stored within a vibration sequence database 116 may comprise any combination of short and long vibrations 308, 310.

Although the vibration sequence 302 is depicted as a sequence of short and long vibrations, it can be appreciated that vibrations contained within a vibration sequence may include many different time periods, speeds and intensities. For example, additionally or alternatively to the vibration sequence 302 having some combination of short and long vibrations 308, 310, the vibrate motor 118 may be instructed to vary speed of the vibrations, such as faster sequences, slower sequences, and any number of intermediate speeds therebetween. In another example, the vibrate motor 118 may be instructed vary the intensity of the vibrations, such as smoother vibrations, rougher vibrations, and any number of intermediate intensities therebetween. These and other vibration characteristics may be used to create unique and recognizable tactile output for the various aspects or characteristics of a message.

In some cases, the vibration sequence 302 may be configured by a user of a mobile computing device 120. For example, the mobile computing device 120 may allow a user to configure a particular vibration sequence 302. A user of a mobile computing device 120 may be able to assign a customized or created vibration sequence to a priority level. The configuration and assignment of vibration sequences may be performed within a (UI) supported by the mobile computing device 120. In other cases, the vibration sequence 302 may be automatically configured in accordance with a given set of heuristics or rules provided for the mobile computing device 120.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 4:
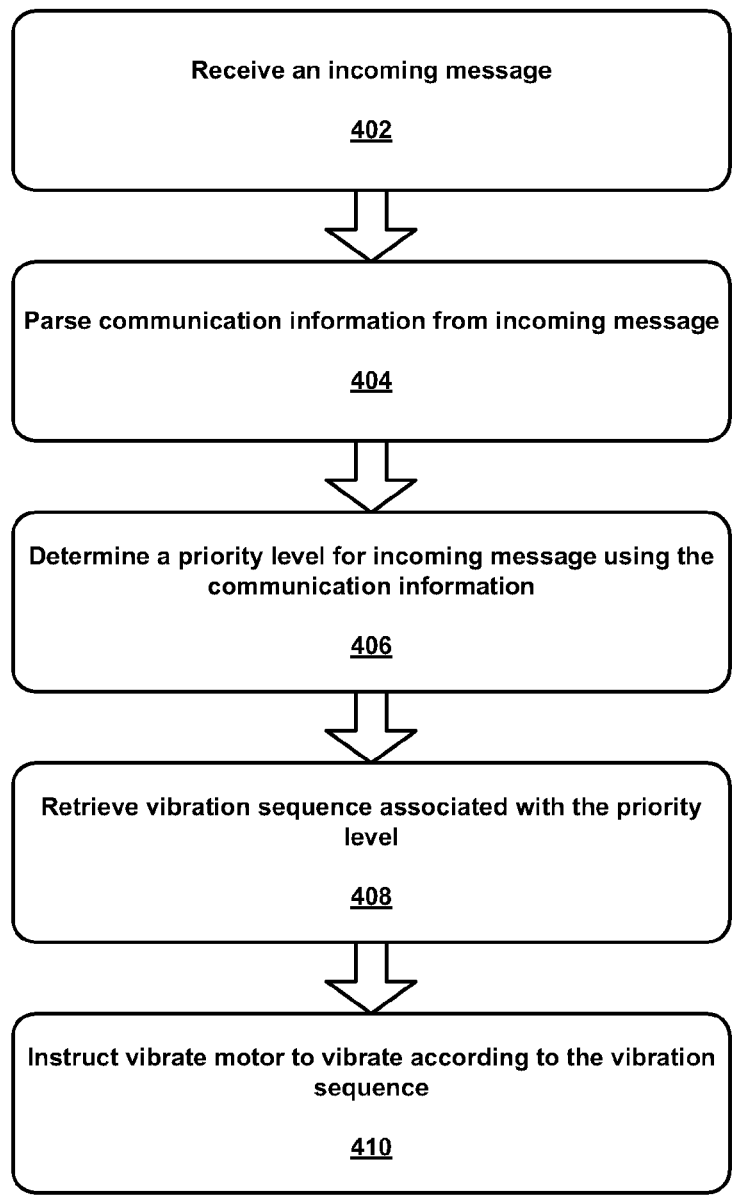
FIG. 4 illustrates one embodiment of a logic diagram.

FIG. 4 illustrates one embodiment of a logic flow. FIG. 4 illustrates a logic flow 400. Logic flow 400 may be representative of the operations executed by one or more embodiments described herein.

As shown in logic flow 400, an incoming message may be received at block 402. For example, the messaging client 126 of the mobile computing device 120 may receive the incoming message 102.

The logic flow 400 may parse communication information from the incoming message at block 404. For example, the message parser 104 of the mobile computing device 120 may communicate communication information 106 to priority detection module 110.

The logic flow 400 may use the communication information to determine a priority level for the incoming message at block 406. For example, the priority detection module 110 of mobile computing device 120 may access the priority association database 108 to retrieve a priority level associated with the communication information 106. The priority detection module 110 may communicate priority level 112 to the motor controller 114.

The logic flow 400 may use the priority level to retrieve a vibration sequence associated with the priority level at block 408. For example, the motor controller 114 may access the vibration sequence database 116 to retrieve a vibration sequence 128 associated with the priority level 112.

The logic flow 400 may instruct a vibrate motor to vibrate in accordance with the retrieved vibration sequence at block 410. For example, the motor controller 114 of mobile computing device 120 may instruct vibrate motor 118 to vibrate in accordance with the vibration sequence 128.

The operation of the above described structures and associated logic flow may be further described by way of the following examples. The user of the mobile computing device 120 may prioritize different incoming messages, such as incoming message 200, based upon a variety of factors. These factors may include, but are not limited to, message type 202, sender identification 204, message urgency 206, receiver identification 208 and message content 210. For example, the user may prefer to immediately answer all incoming phone calls from the office. The user may also prefer to ignore all email messages that are not urgent. The user may configure different priority levels with various vibration sequences, such as vibration sequences 302, 304 and 306, using vibration tone differentiation. The user may choose the vibration sequence 302 to associate with incoming phone calls from the office, for example. The user may choose vibration sequence 304 to associate with all email messages that are not urgent. The mobile computing device 120 may be located within the user's pocket or handbag, for example. When the mobile computing device 120 uses a vibration tone to notify the user of an incoming communication, the user will quickly be able to determine whether the incoming communication is important to them. Vibration tone differentiation helps to alleviate the risk of ignoring an important phone call because the user confused it with an unimportant email message based upon a standard vibration tone.

Figure 5:
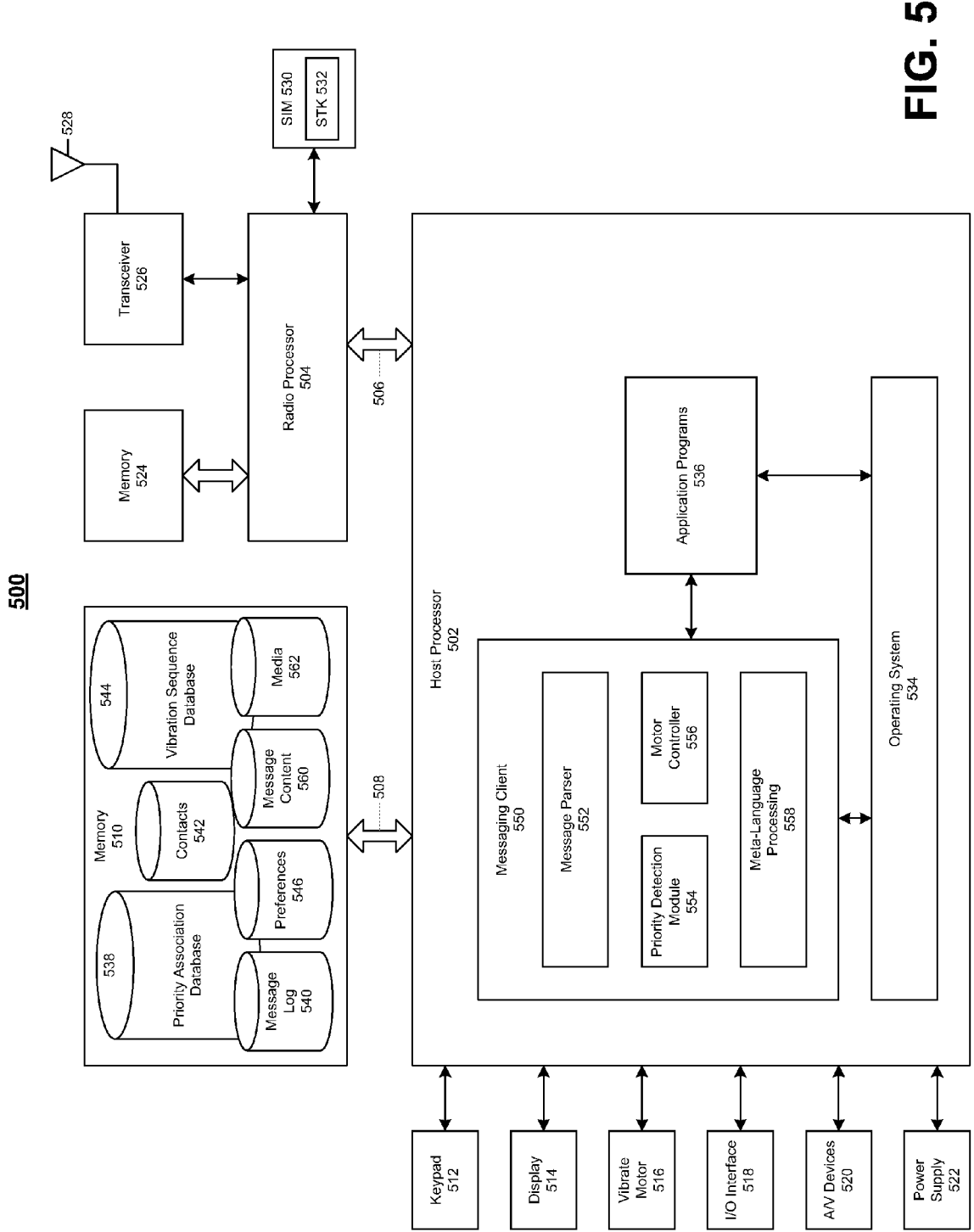
FIG. 5 illustrates one embodiment of a mobile computing device

FIG. 5 illustrates a mobile computing device 500 in accordance with one or more embodiments. The mobile computing device 500 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 500 implemented as a smart phone by way of example, it may be appreciated that the embodiments are not limited in this context. For example, the mobile computing device 500 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The mobile computing device 500 may provide voice communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth.

In addition to voice communications functionality, the mobile computing device 500 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

The mobile computing device 500 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 500 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

As shown in the embodiment of FIG. 5, the mobile computing device 500 may comprise a dual processor architecture including a host processor 502 and a radio processor 504. In various implementations, the host processor 502 and the radio processor 504 may be arranged to communicate with each other using interfaces 506 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 502 may be responsible for executing various software programs such as system programs and applications programs to provide computing and processing operations for the mobile computing device 500. The radio processor 504 may be responsible for performing various voice and data communications operations for the mobile computing device 500 such as transmitting and receiving voice and data information over one or more wireless communications channels. Although some embodiments may be described as comprising a dual processor architecture for purposes of illustration, it is worthy to note that the mobile computing device 500 may comprise any suitable processor architecture and/or any suitable number of processors consistent with the described embodiments.

The host processor 502 may be implemented as a host central processing unit (CPU) using any suitable processor or logic device, such as a as a general purpose processor. Although some embodiments may be described with the host processor 502 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 502 may be coupled through a memory bus 508 to a memory 510. The memory bus 508 may comprise any suitable interface and/or bus architecture for allowing the host processor 502 to access the memory 510. Although the memory 510 may be shown as being separate from the host processor 502 for purposes of illustration, it is worthy to note that in various embodiments some portion or the entire memory 510 may be included on the same integrated circuit as the host processor 502. Alternatively, some portion or the entire memory 510 may be disposed on an integrated circuit or other medium (e.g., hard disk drive) external to the integrated circuit of host processor 502. In various embodiments, the mobile computing device 500 may comprise an expansion slot to support a multimedia and/or memory card, for example.

The memory 510 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 500 may comprise an alpha-numeric keypad 512 coupled to the host processor 502. The keypad 512 may comprise, for example, a QWERTY key layout and an integrated number dial pad. The mobile computing device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The mobile computing device 500 may comprise a display 514 coupled to the host processor 502. The display 514 may comprise any suitable visual interface for displaying content to a user of the mobile computing device 500. In one embodiment, for example, the display 514 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

The mobile computing device 500 may comprise a vibrate motor 516 coupled to the host processor 502. The vibrate motor 516 may be enable or disabled according to the preferences of the user of the mobile computing device 500. When enabled, the vibrate motor 516 may cause the mobile computing device 500 to move or shake in a generic and/or patterned fashion in response to a triggering event such as the receipt of a telephone call, text message, an alarm condition, a game condition, and so forth. Vibration may occur for a fixed duration and/or periodically according to a pulse, for example.

The mobile computing device 500 may comprise an input/output (I/O) interface 516 coupled to the host processor 502. The I/O interface 518 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile computing device 500 may be arranged to transfer and/or synchronize information with the local computer system.

The host processor 502 may be coupled to various audio/video (A/V) devices 520 that support A/V capability of the mobile computing device 500. Examples of A/V devices 520 may include, for example, a microphone, one or more speakers, an audio port to connect an audio headset, an audio coder/decoder (codec), an audio player, a digital camera, a video camera, a video codec, a video player, and so forth.

The host processor 502 may be coupled to a power supply 522 arranged to supply and manage power to the elements of the mobile computing device 500. In various embodiments, the power supply 522 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 504 may perform voice and/or data communication operations for the mobile computing device 500. For example, the radio processor 504 may be arranged to communicate voice information and/or data information over one or more assigned frequency bands of a wireless communication channel. In various embodiments, the radio processor 504 may be implemented as a communications processor using any suitable processor or logic device, such as a modem processor or baseband processor. Although some embodiments may be described with the radio processor 504 implemented as a modem processor or baseband processor by way of example, it may be appreciated that the embodiments are not limited in this context. For example, the radio processor 504 may comprise, or be implemented as, a digital signal processor (DSP), media access control (MAC) processor, or any other type of communications processor in accordance with the described embodiments.

In various embodiments, the radio processor 504 may perform analog and/or digital baseband operations for the mobile computing device 500. For example, the radio processor 104 may perform digital-to-analog conversion (DAC), analog-to-digital conversion (ADC), modulation, demodulation, encoding, decoding, encryption, decryption, and so forth.

The mobile computing device 500 may comprise a memory 524 coupled to the radio processor 504. The memory 524 may be implemented using one or more types of machine-readable or computer-readable media capable of storing data such as volatile memory or non-volatile memory, removable or non-removable memory, erasable or non-erasable memory, writeable or re-writeable memory, and so forth. The memory 524 may comprise, for example, flash memory and secure digital (SD) RAM. Although the memory 524 may be shown as being separate from and external to the radio processor 504 for purposes of illustration, it is worthy to note that in various embodiments some portion or the entire memory 524 may be included on the same integrated circuit as the radio processor 504.

The mobile computing device 500 may comprise a transceiver module 526 coupled to the radio processor 504. The transceiver module 526 may comprise one or more transceivers arranged to communicate using different types of protocols, communication ranges, operating power requirements, RF sub-bands, information types (e.g., voice or data), use scenarios, applications, and so forth. In various embodiments, the transceiver module 526 may comprise one or more transceivers arranged to support voice communication for a cellular radiotelephone system such as a GSM, UMTS, and/or CDMA system. The transceiver module 526 also may comprise one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth. In some embodiments, the transceiver module 526 may comprise a Global Positioning System (GPS) transceiver to support position determination and/or location-based services.

The transceiver module 526 generally may be implemented using one or more chips as desired for a given implementation. Although the transceiver module 526 may be shown as being separate from and external to the radio processor 504 for purposes of illustration, it is worthy to note that in various embodiments some portion or the entire transceiver module 526 may be included on the same integrated circuit as the radio processor 504. The embodiments are not limited in this context.

The mobile computing device 500 may comprise an antenna system 528 for transmitting and/or receiving electrical signals. As shown, the antenna system 528 may be coupled to the radio processor 504 through the transceiver module 526. The antenna system 528 may comprise or be implemented as one or more internal antennas and/or external antennas.

The mobile computing device 500 may comprise a subscriber identity module (SIM) 530 coupled to the radio processor 504. The SIM 530 may comprise, for example, a removable or non-removable smart card arranged to encrypt voice and data transmissions and to store user-specific data for allowing a voice or data communications network to identify and authenticate the user. The SIM 530 also may store data such as personal settings specific to the user.

As mentioned above, the host processor 502 may be arranged to provide processing or computing resources to the mobile computing device 500. For example, the host processor 502 may be responsible for executing various software programs such as system programs and application programs to provide computing and processing operations for the mobile computing device 500.

System programs generally may assist in the running of the mobile computing device 500 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile computing device 500 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Application programs generally may allow a user to accomplish one or more specific tasks. Examples of application programs may include, without limitation, one or more messaging applications (e.g., telephone, voicemail, facsimile, e-mail, IM, SMS, MMS, video conferencing, instant messaging), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the mobile computing device 100 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

As shown in FIG. 5, the mobile computing device 500 may comprise or implement messaging client 550 arranged to communicate various types of messages in a variety of formats. The messaging client 550 may be enabled to handle messages of particular types and formats for a particular application. The messaging client 550 may comprise, for example, a message parser 552, a priority detection module 554, a motor controller 556 and meta-language processing 558. It is to be understood that the embodiments are not limited in this regard and that the messaging client 550 may include any other type of messaging or communications application which is consistent with the described embodiments. It also is to be appreciated that the mobile computing device 500 may implement other types of applications in addition to the messaging client 550 which are consistent with the described embodiments.

The mobile computing device 500 may comprise a priority association database 538. The priority association database 538 may be arranged to store various communication information that has been parsed by the message parser 552. The priority association database 538 may be arranged to store various priority levels. The priority association database 538 may associate one or more priority levels with communication information. In some embodiments, the user of mobile computing device 500 may be able to configure the priority association database 538. The priority association database 538 may be implemented in the memory 510 of the mobile computing device 500, for example.

The mobile computing device 500 may comprise a vibration sequence database 544. The vibration sequence database 544 may be arranged to store various priority levels. The vibration sequence database 544 may be arranged to store one or more vibration sequences. The vibration sequence database 544 may associate one or more priority levels with one or more vibrations sequences. In some embodiments, the vibration sequences may comprise short and long vibrations, for example. In some embodiments, the user of mobile computing device 500 may be able to configure the vibration sequence database 544. The vibration sequence database 544 may be implemented in the memory 510 of the mobile computing device 500, for example.

The mobile computing device 500 may comprise a media database 562. The media database 562 may be arranged to store various types of media content such as image information, audio information, video information, A/V information, and/or other data. In some embodiments, the media database 562 may be implemented in the memory 562 of the mobile computing device 562. The media database 562 may be arranged to store various types of compressed or uncompressed content or information. The content or information may be associated with one or more images, image files, image groups, pictures, digital photographs, music files, sound files, voice information, videos, video clips, video files, video sequences, video feeds, video streams, movies, broadcast programming, television signals, web pages, user interfaces, graphics, textual information (e.g., encryption keys, serial numbers, e-mail messages, text messages, instant messages, contact lists, telephone numbers, task lists, calendar entries, hyperlinks), numerical information, alphanumeric information, character symbols, and so forth. The content or information also may include command information, control information, routing information, processing information, system file information, system library information, software (e.g., OS software, file system software, application software, game software), firmware, an application programming interface (API), a program, an applet, a subroutine, an instruction set, an instruction, computing code, logic, words, values, symbols, and so forth.

The mobile computing device 500 may comprise a preferences database 546. The preferences database 546 may be arranged to store various settings such as rules and parameters for controlling the operation of the mobile computing device 500. In some embodiments, the preferences database 546 may store privacy rules and security parameters for controlling communications options for one or more messaging applications provided by the mobile computing device 500. The preferences database 546 may be implemented in the memory 510 of the mobile computing device 500, for example.

The mobile computing device 500 may comprise a message content database 560. The message content database 560 may be arranged to store content and attachments (e.g., media objects) of messages sent and received by the messaging client 550. The message content database 560 maybe implemented in the memory 510 of the mobile computing device, for example.

The mobile computing device 500 also may comprise a contacts database 542. The contacts database 542 may be arranged to store contact records for individuals or entities specified by the user of the mobile computing device 500. The contact record for an individual may comprise identifying information such as first name, last name, company/employer name, mailing addresses (e.g., home, work, other), telephone numbers (e.g., home, work, mobile, fax, pager), e-mail address (e.g., home, work, primary, alternative), IM screen names, SMS identifier, MMS identifier, personal information, notes, and so forth.

The contacts database 542 may be used or accessed when receiving and/or sending messages. In various embodiments, identifying information (e.g., telephone number, e-mail address, IM screen name, SMS identifier, MMS identifier, etc.), included in messages received by the messaging client 550 may be compared against the contacts database 542 to identify the sender of a message. The contacts database 542 also may be used or accessed when composing and/or sending messages. For example, the user of the mobile computing device 500 may search for and open the contact record of a particular individual to initiate communication. In addition, contact records in the contacts database 542 may be filtered and matched against text typed by a user in messaging client 550 to facilitate message addressing.

The mobile computing device 500 may comprise a message log 540. The message log 540 may be arranged to track various types of messages which are sent and received by the mobile computing device. Entries in the message log 540 may reflect recently made or attempted communications. In various implementations, the entries in the message log 540 may be accessed by the user for replying to a missed message and/or for reinitiating or reattempting communication with a particular individual.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device comprising:
 a priority association database to store one or more priority levels for communication information;
 a messaging client to receive an incoming message sent to the mobile computing device and parse communication information from the incoming message, the communication information including an internet protocol address of a sender of the incoming message, the messaging client further comprising a priority detection module to determine a priority level of the incoming message from one of the priority levels associated with the internet protocol address of the incoming message in the priority association database,
a motor controller to retrieve a vibration sequence associated with the priority level and to instruct a vibrate motor to vibrate according to the vibration sequence.

2. The mobile computing device of claim 1, the messaging client comprising a message parser to parse the communication information from the incoming message.

3. The mobile computing device of claim 1, the communication information further comprising one or more of a message type, email information, sender identification, message urgency, voicemail information and receiver identification.

4. The mobile computing device of claim 1, wherein the one or more priority levels are configured by a user of the mobile computing device.

5. The mobile computing device of claim 1, further comprising a vibration sequence database to store vibration sequences for priority levels.

6. The mobile computing device of claim 5, wherein the vibration sequences are configured by a user of the mobile computing device.

7. The mobile computing device of claim 1, the vibration sequence comprising a pattern of short and long vibrations.

8. The mobile computing device of claim 1, the incoming message including a website notification, and the priority detection module to determine the priority level of the incoming message from one of the priority levels associated with the website notification in the priority association database.

9. A method in a mobile computing device, comprising:
storing one or more priority levels for communication information in a priority association database;
receiving an incoming message, the incoming message including communication information;
parsing the communication information from the incoming message, the communication information from the incoming message including an internet protocol address of a sender of the incoming message;
determining a priority level of the incoming message from one of the priority levels associated with the internet protocol address of the incoming message in the priority association database;
retrieving a vibration sequence associated with the priority level; and
instructing a vibrate motor to vibrate according to the vibration sequence.

10. The method of claim 9, the communication information further comprising one or more of a message type, e-mail information, sender identification, message urgency, voicemail information, and receiver identification.

11. The method of claim 9, wherein the one or more priority levels for communication information are configured by a user of a wireless communication device.

12. The method of claim 9, further comprising storing vibration sequences for priority levels in a vibration sequence database.

13. The method of claim 12, wherein the vibration sequences are configured by a user of a wireless communication device.

14. The method of claim 9, wherein the vibration sequence comprises a pattern of short and long vibrations.

15. A non-transitory computer-readable storage medium storing executable computer program instructions that when executed enable a computing system to:
store one or more priority levels for communication information in a priority association database;
receive an incoming message, the incoming message including communication information;
parse the communication information from the incoming message, the communication information including an internet protocol address of a sender of the incoming message;
determine a priority level of the incoming message from one of the priority levels associated with the internet protocol address of the incoming message in the priority association database;
retrieve a vibration sequence associated with the priority level; and
instruct a vibrate motor to vibrate according to the vibration sequence.

16. The non-transitory computer-readable storage medium of claim 15, the communication information further comprising one or more of a message type, e-mail information, sender identification, message urgency, voicemail information, and receiver identification.

17. The non-transitory computer-readable storage medium of claim 15, wherein the one or more priority levels for communication information are configured by a user of a mobile computing device.

18. The non-transitory computer-readable storage medium of claim 15, further comprising executable computer program instructions that when executed enable the computer system to store vibration sequences for priority levels in a vibration sequence database.

19. The non-transitory computer-readable storage medium of claim 18, wherein the vibration sequences are configured by a user of a mobile computing device.

20. The non-transitory computer-readable storage medium of claim 15, wherein the vibration sequence comprises a pattern of short and long vibrations.

* * * * *